United States Patent
Goodspeed et al.

[11] Patent Number: 5,518,695
[45] Date of Patent: May 21, 1996

[54] VENTED RISER WITH COMPACT MULTIPLE CYCLONE ARRANGEMENT

[75] Inventors: Randall F. Goodspeed, Palatine; Todd P. Mitchell, Bartlett; Paolo Palmas, Des Plaines; Kalidas Puppala, Northbrook, all of Ill.

[73] Assignee: UOP, Des Plaines, Ill.

[21] Appl. No.: 336,906

[22] Filed: Nov. 10, 1994

[51] Int. Cl.⁶ .................................. F27B 15/08
[52] U.S. Cl. .................. 422/144; 422/145; 422/147; 208/153; 55/318; 55/345
[58] Field of Search ................. 422/139, 144, 422/145, 147; 208/153, 161, 163, 164, 113; 55/318, 432, 345

[56] References Cited

U.S. PATENT DOCUMENTS

| | | | |
|---|---|---|---|
| 2,535,140 | 12/1950 | Kassel | 183/83 |
| 4,173,527 | 11/1979 | Heffley et al. | 208/153 |
| 4,588,558 | 5/1986 | Kam et al. | 422/113 |
| 4,666,674 | 5/1987 | Barnes | 422/144 |
| 4,670,410 | 6/1987 | Baillie | 502/41 |
| 4,701,307 | 10/1987 | Walters et al. | 422/147 |
| 4,737,346 | 4/1988 | Hoddard et al. | 422/144 |
| 4,792,437 | 12/1988 | Hettinger, Jr. et al. | 422/147 |
| 4,869,880 | 9/1989 | Hettinger et al. | 422/147 |
| 5,190,650 | 3/1993 | Tammera et al. | 210/256 |
| 5,218,931 | 6/1993 | Gorzegno | 122/4 D |
| 5,286,281 | 2/1994 | Bartholic | 95/271 |
| 5,290,431 | 3/1994 | Cunningham | 208/164 |
| 5,302,280 | 4/1994 | Lomas et al. | 208/113 |
| 5,370,844 | 12/1994 | Peterson | 422/147 |
| 5,393,414 | 2/1995 | Lomas et al. | 208/161 |
| 5,393,415 | 2/1995 | Sechrist et al. | 208/161 |

*Primary Examiner*—N. Bhat
*Attorney, Agent, or Firm*—Thomas K. McBride; John G. Tolomei

[57] ABSTRACT

This invention is a vented riser arrangement for multiple cyclones having an open inlet configuration that reduces the space requirements of the cyclone and eliminates the extended inlet conduit. The inlet configuration extends the outer cylindrical wall of the cyclone in a semicircular path that extends past the interior of the cyclone by a distance that cuts off the path of solids by-passing into the cyclone. The configuration eliminates the need for a cyclone inlet conduit that enlarged the required transverse area necessary to house the riser and the cyclones.

5 Claims, 3 Drawing Sheets

VENTED RISER WITH COMPACT MULTIPLE CYCLONE ARRANGEMENT

BACKGROUND OF THE INVENTION

1. Field of the Invention

This invention relates generally to the FCC process. More specifically, this invention relates to the separation of catalyst and gaseous materials from a mixture thereof as it is discharged from the riser.

2. Description of the Prior Art

The FCC process and ballistics separation devices, or vented risers as they are more commonly referred to, are well known in the prior art. The FCC processes, as well as vented risers, are fully described in U.S. Pat. Nos. 4,701,307 and 4,792,437, the contents of which are hereby incorporated by reference. An enclosed vented riser for an FCC process discharges a mixture of catalysts and gaseous materials outwardly from the open end of a riser into a reactor vessel. In its basic form, the structure of a vented riser consists of a straight conduit section at the end of the riser and an opening that is directed upwardly into a reactor vessel with a number of cyclone inlets surrounding the outer periphery of the riser near the open end. The apparatus functions by shooting the high momentum catalyst particles past the open end of the riser. A quick separation between the catalyst and the vapors occurs due to the relatively low density of the vapors which can quickly change direction and turn to enter the inlets of the cyclones near the periphery of the riser while the heavier catalyst particles continue along a straight trajectory that is imparted by straight section of the riser conduit.

It has long been known that vented risers require a large open volume in the reactor vessel for operation. The large volume has been necessitated in part by the arrangement of the cyclone inlets relative to the reactor riser. These arrangements have included extended inlet nozzles into the cyclones as well as the use of an annular chamber defined by a cup that surrounds the riser and communicates with the cyclone inlets. Cyclones for separating particulate material from gaseous materials are well known to those skilled in the art of FCC processing. Cyclone arrangements and modifications thereto are generally disclosed in U.S. Pat. Nos. 4,670,410 and 2,535,140. The cup and the extended inlets of the cyclones feed gaseous materials containing a relatively low loading of catalyst particles tangentially into the barrel of a cyclone. Tangential entry of the gaseous materials and catalyst creates a spiral flow path that establishes a vortex configuration in the cyclone so that centripetal acceleration associated with an outer vortex causes catalyst particles to migrate towards the outside of the barrel while the gaseous materials enter an inner vortex for eventual discharge through an upper outlet. The heavier catalyst particles accumulate on the side wall of the cyclone barrel and eventually drop to the bottom of the cyclone and out via an outlet and a dip leg conduit for recycle through the FCC arrangement. The purpose of the collector cup and extended cyclone inlets is to prevent catalyst particles from short circuiting the outer vortex of the cyclone and thereby increasing the loading of catalysts particles discharged through the vapor outlets of the cyclones.

It is highly desirable to reduce the transverse cross-section required to contain the vented riser arrangement and FCC separation vessels in general. Larger vessels and the complicated inlet tube arrangements associated with previous vented riser designs add to the overall cost of the system. Moreover, the additional cross-section required for prior art vented riser designs add to the total volume in the reactor vessel which increases the residence time of hydrocarbons located therein and, generally, has adverse effects on the selectivity of the catalytic cracking and the production of desired products.

BRIEF SUMMARY OF THE INVENTION

It has now been discovered that the overall diameter of a reactor necessary to house a vented riser and a plurality of cyclones can be reduced by the use of a specific cyclone configuration. The need for an extended inlet conduit or a collector cup is eliminated thereby permitting closer packing of the cyclones adjacent to the riser which in turn reduces the required horizontal cross-section of the reactor vessel.

Accordingly, this invention is a vented riser arrangement for multiple cyclones in an FCC vessel. The cyclones have an open inlet configuration that reduces the space requirements of the cyclones and eliminates the extended inlet conduits and collector cup. The inlet configuration extends the outer cylindrical wall of the cyclone in a semi-circular path that extends past the edge of an interior cyclone opening by a distance that cuts off any path which would permit catalyst to by-pass the outer vortex of the cyclone. Thus, the configuration eliminates the need for a cyclone inlet conduit that enlarges the required transverse area necessary to house the riser and the cyclones.

Accordingly, in one embodiment this invention is an FCC apparatus for separating catalyst from gaseous fluids. The apparatus includes a vessel, a riser conduit extending into the vessel and terminating with an open end within the vessel, and a plurality of cyclones separators located within the vessel. The cyclone separators have a specific arrangement that permits their location within close proximity of the riser. The specific arrangement of the cyclones includes a cylindrical barrel vertically positioned about a vertical line and curvature. The cylindrical barrel defines an open interior volume that communicates with a particle outlet for discharging catalyst from the bottom of the cyclone. A top closure of the cyclone defines a cylindrical outlet conduit located above the interior volume along the vertical center line. The outlet conduit has a second radius of curvature that is less than the first radius of curvature. An upper portion of the cylindrical barrel defines an open sector that is cut from the barrel and has an included angle of less than 180°. The barrel also defines an inlet edge at one end of the open sector. The curved plate covers the open sector and has a third radius of curvature about a vertical axis. The third radius of curvature exceeds the first radius of curvature. A distal end of the curved plate defines a vertically extended edge that overlaps the barrel to define an open inlet for the cyclone. The curved plate overlaps the inlet edge by a distance such that a straight horizontal line projecting from the vertically extended edge through the vertical inlet edge passes outside the outlet tube or its vertical projection.

The vented riser arrangement of this invention and the specific cyclone configuration is susceptible to a variety of applications and variations. The vented riser arrangement finds utility on either the reactor or the regenerator side of the process where vented riser arrangements have been used or proposed.

In other specific cyclone configurations, the curved plate can have at least two radii of curvature or comprise a spiral section with a constantly increasing radius of curvature. The overlapping of the curved plate over the barrel of the cyclone may be increased as desired in order to further improve the separation efficiency of the cyclone. However, excessive overlapping of the cyclone by the curved plates will diminish the utility of the invention by again increasing the diameter of the vessel required to house the vented riser configuration.

The remainder of this invention is described in the context of a detailed description of the preferred embodiment. Description of this invention in the context of a specific embodiment is not meant to limit the scope of the invention to the details disclosed therein.

DESCRIPTION OF THE PREFERRED EMBODIMENT

Figure 1:
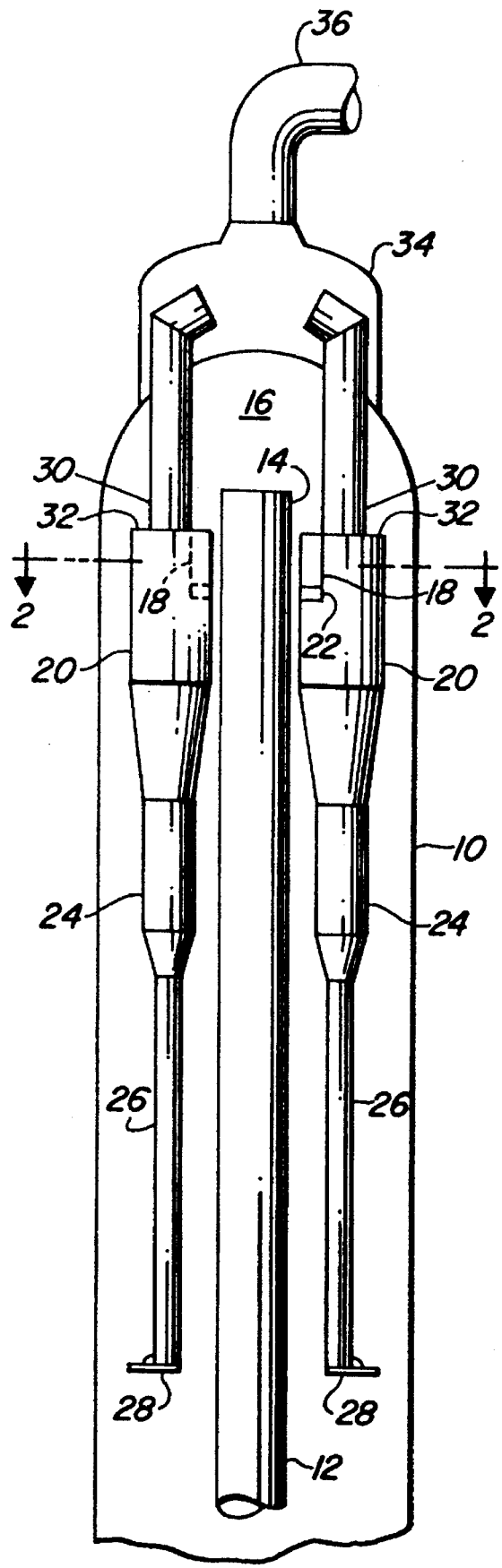
FIG. 1 is a sectional elevation of an FCC reactor vessel schematically showing a riser and cyclone arrangement.

Looking then at FIG. 1, the schematic illustration depicts a vented riser arrangement in a reactor vessel 10. A reactor riser 12 extends upwardly from a lower portion of the vessel in a typical FCC arrangement which is well known to those skilled in the art. Riser 12 terminates in an upper portion of reactor vessel 10 with an open end 14. Open end 14 discharges a mixture of gaseous material and catalyst. The gaseous material when the vessel 10 is a reactor comprises product vapors that pass upwardly into an upper volume 16 of the reactor vessel. The high momentum of the catalyst particles discharged from end 14 carry them away from inlets 18 of cyclones 20. The lower density gaseous material stream discharged from the end of riser 14 quickly changes direction and passes into openings 18. To facilitate the entry of vapors into the inlets 18, the bottom of the inlet provides a curved section 22 having the shape of a typical cyclone inlet horn. The width and the height of inlet opening 18 is sized by ordinary criteria for the sizing of cyclone inlets. Typical criteria includes sizing the inlet for a gas velocity of 50 to 75 ft/sec. Other criteria for sizing the opening usually requires an area for the cyclone inlet that is equal to about ⅓ to ⅙ of the transverse (horizontal) area of the cyclone barrel with the inlet having a height to width ratio generally in the range of 2 to 3.5.

Gaseous material entering cyclone 18 contains a light catalyst loading usually in the range of 0.1 to 1.0 lbs/ft$^3$. Cyclone 20 provides a typical tangential arrangement for inlet opening 18. Tangential entry of the gaseous material creates the usual swirling action of the gaseous material inside the cyclone to establish the well known inner and outer vortex pattern that separates catalyst from the gases. As catalyst moves downwardly through the outer vortex, centripetal acceleration urges catalyst cyclone outwardly to the wall of the cyclone barrel. Catalyst falling along the wall of the cyclone collects in a bottom hopper 24 of the cyclone for return to the reactor vessel through a dip pipe conduit 26. Dip pipe conduits 26 operate in the ordinary manner of typical FCC cyclone arrangements and may discharge catalyst directly into a dense bed, discharge catalyst above a dense bed, and may use flow regulating means at the bottom of the dip pipe such as flapper valves 28 as shown in FIG. 1 to control the discharge of catalyst.

At some point above or within dust hopper 24 of the cyclones 20, the outer vortex terminates in and the inner vortex is formed which progresses upwardly through the cyclone and discharges vapors into an outlet tube 30. Outlet tube 30 typically has a diameter that approximates the outer periphery of the inner cyclone vortex. As known by those skilled in the art of cyclone design, there may be possible benefits to extending cyclone inlet tube 30 downwardly below a top 32 of the cyclones and into the inside volume of the cyclone. In the arrangement of FIG. 1, the gas outlet tubes also provide conduits that pass the gaseous material into a chamber 34 for collection and withdrawal from the reactor vessel through an outlet conduit 36.

Figure 2:
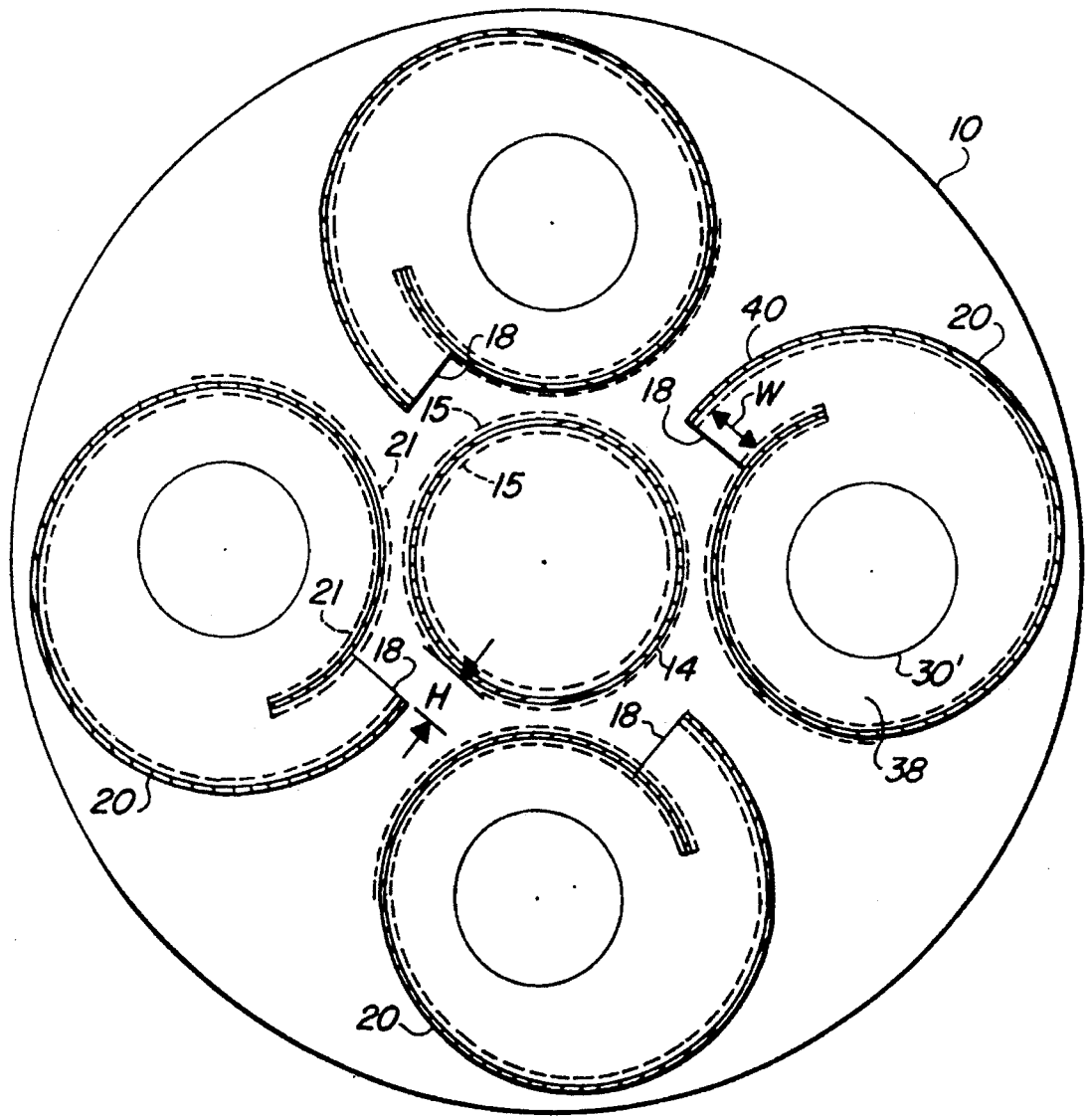
FIG. 2 is a transverse section of the FCC vessel disclosed in FIG. 1 taken along lines 2—2 and illustrating the internal arrangement of the cyclones and riser.

This specific arrangement of the cyclone inlets is shown more fully in FIG. 2. FIG. 2 depicts a plan view of an arrangement for four cyclones 20 positioned about end 14 of the central riser conduit 12. In typical arrangements, the inside and outside of the riser will have an abrasion resistant lining 15; the outer contours of which are indicated by the dashed lines in FIG. 2. In addition, an abrasion resistant lining 21 as indicated by the dashed lines in FIG. 2 also covers the inside of the cyclones as well as the surfaces of the cyclone adjacent to riser 14 and inlet openings 18 of cyclones 20.

Inlet openings 18 have an opening as indicated by the letter "W" in FIG. 2. FIG. 2 also indicates a projection 30' of gas outlet tube 30. The inlet "W" is separated from the interior volume 38 of the cyclone by the overlapping of the outer plate 40 around a portion of the cyclone barrel 42. The overlapping of cyclone barrel section 42 with curved plate 40 prevents short circuiting of catalyst across the inlet of the cyclone and directly into the inner vortex of the cyclone. By preventing this short circuiting, inlets 18 of the cyclones may be located in close proximity to the riser without reducing the separation efficiency of the cyclones. Thus, the cyclones may be placed in a close arrangement with as little as 2 inches of clearance between either of the cyclones and the riser or the cyclones and the wall of vessel 10. Preferably the clearance between the cyclones and either the wall of the vessel or the riser will be 3 to 4 inches. In addition, the cyclone inlet 18 may be located in close proximity to the riser to collect gaseous material from a volume of the reactor vessel that contains the lightest loading of catalyst. A distance indicated by dimension "H" defines the spacing of inlet 18 from riser 14. "H" is generally equal to at least a quarter of the diameter of riser conduit 14 and more typically equals at least 40% of the inside diameter or riser 14.

Figure 3:
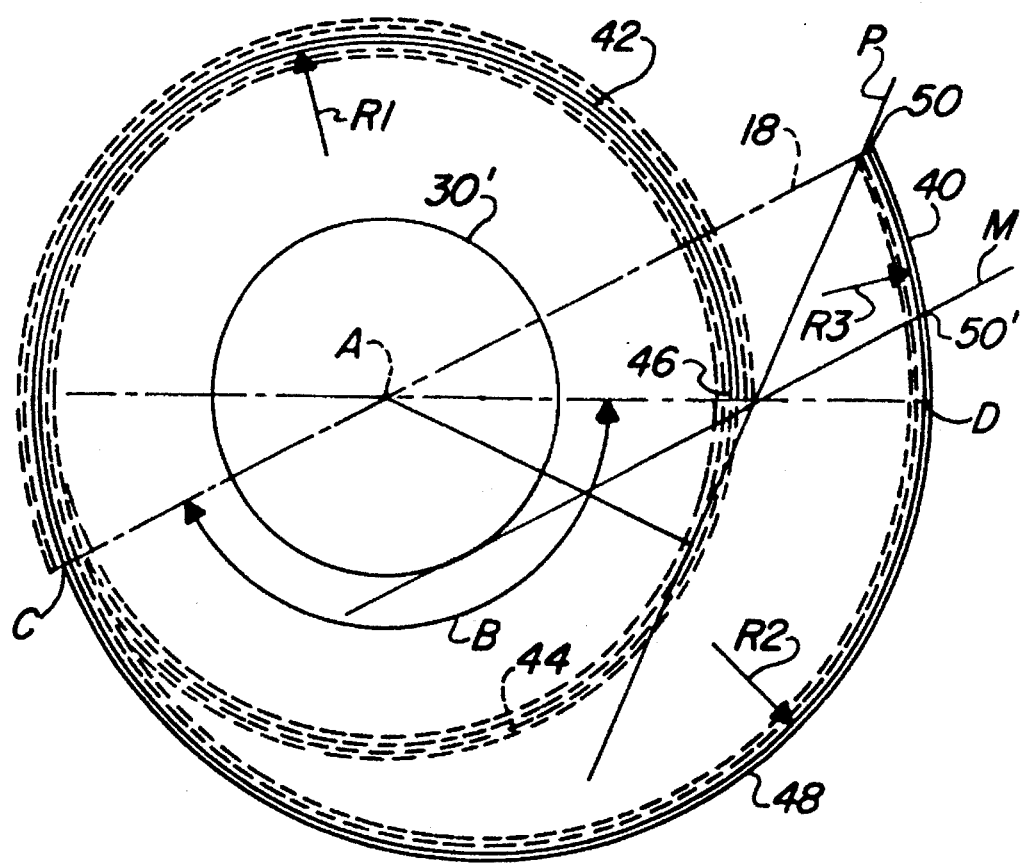
FIG. 3 is an enlarged view of one of the cyclones shown in FIG. 2.

FIG. 3 more fully illustrates the specific geometry associated with inlet opening 18 and the overlapping of curved plate 40 with barrel section 42. The cylindrical barrel section 42 is a metal wall with a radius R1 that wraps about a central axis that extends vertically through a point "A". Barrel 42 provides an inlet for gases into the cyclone by removing a portion of wall 42 about an arc "B" as defined in the figure to provide an open sector of the wall. The open sector subtends an angle of less than 180° such that angle "B" is less than 180°. Open sector 44 has a vertical length that is less than the total length of the cyclone barrel and typically approximates the height of inlet opening 18. The end of opening 44 nearest inlet 18 defines a vertical inlet edge 46. Vertical inlet 46 defines the edge of the interior cyclone opening.

A curved plate section 48 covers the open sector 44. Curved plate 48 has a radius R2 that is larger than radius R1 so that the radius of the cyclone is enlarged over the curved sector and the wall of the cyclone extends outward to overlap a portion of cyclone barrel 42 in providing inlet 18.

Curved plate section 48 ordinarily begins with an attachment to barrel 42 at the beginning of open sector 44 as defined by location "C" in FIG. 3. Preferably, curved section 48 has a constant radius R2 about a vertical center line that is offset from center line "A" so that a continuous curvature may be maintained between barrel 42 and curve plate 48.

In a preferred form of this invention, curved plate 48 will end with a curved plate section 40 having a constant radius about the vertical axis that passes through point "A". Therefore, the radius R3 of curved section 40 will equal the radius of the barrel plus the width of the inlet opening. The provision of curved section 40 having the preferred radius R3 provides a uniform flow channel immediately downstream of inlet opening 18. The transition between radius R2 and R3 preferably lies along a line defined at a point "D" which is along a direct radially outward path from inlet edge 46.

The outer edge of plate section 40 provides a vertically extended edge that defines the outer edge 50 of the inlet opening 18. A key feature of this invention is the positioning of the outer edge 50 relative to the vertical inlet edge 46. In accordance with this invention, the minimum extent to which plate 40 overlaps barrel 42 is defined such that a horizontal line drawn tangent to outlet tube 30' and through inlet edge 46 contacts outer the edge of curved plate 40. For example, in FIG. 3, the intersection of the horizontal line M with the outer edge of curved plate 40 at a point 50' defines the minimum about by which the vertically extended edge 50' must extend past inlet edge 46. The preferred extent of overlap for plate section 40 which in turn defines the location of the vertically extended edge 50 is defined by drawing a line "P" tangent to the inside radius of the cyclone barrel that passes through the outer edge of the lining at the location of inlet edge 46. The intersection of "P" with the curved section 40 defines the preferred location for the vertically extended edge 50 of the inlet opening 18. It is not preferred to extend the inlet opening past that determined by line "P" since the additional length of the curved plate defines a longer flow channel that does not appreciably increase the efficiency of the cyclone and mainly serves to increase the overall diameter requirements of the vessel in which the riser and cyclone arrangement is located.

What is claimed is:

1. An FCC apparatus for separating catalyst from gaseous fluids, said apparatus comprising:

a vessel, a riser conduit extending into said vessel and terminating with an open end located within said vessel; and, a plurality of cyclone separators located within said vessel, each of said cyclone separators including a cylindrical barrel having a first radius of curvature and extending downwardly about a vertical centerline and defining an open interior volume, a particle outlet in communication with the bottom of said interior volume, a top closure defining a cylindrical outlet conduit located above said open interior volume along said vertical centerline, said outlet conduit having a second radius of curvature that is less than said first radius of curvature, an open sector having a vertical inlet edge defined by an upper portion of said barrel and having an included angle of less than 180°, and a curved plate covering said open sector having a third radius of curvature about a vertical axis, wherein said third radius of curvature exceeds said first radius of curvature, and a distal end defining a vertically extended edge that overlaps said barrel to define an open inlet for said cyclone directed toward said riser, wherein said curved plate overlaps said inlet edge by a distance such that a straight horizontal line projecting from said vertically extended edge through said vertical inlet edge passes outside the vertical projection of said outlet tube.

2. The apparatus of claim 1 wherein said curved plate has at least two radii of curvature that exceed said first radius of curvature.

3. The apparatus of claim 2 wherein said distal end of said curved plate defines a fourth radius of curvature that exceeds said first radius of curvature.

4. The apparatus of claim 1 wherein said first radius of curvature defines an inside diameter of said barrel and the projection of said straight horizontal line is tangent to or passes through said inside diameter.

5. The apparatus of claim 1 wherein said FCC apparatus comprises at least three cyclone separators.

\* \* \* \* \*